Feb. 7, 1961  J. C. GEVAS  2,971,141
ERROR SIGNAL SAMPLING DIGITAL SERVO SYSTEM
Filed June 5, 1959  3 Sheets-Sheet 1

JAMES C. GEVAS, INVENTOR.

BY Andrew L. Bain
George J. Seligsohn

JAMES C. GEVAS, INVENTOR.

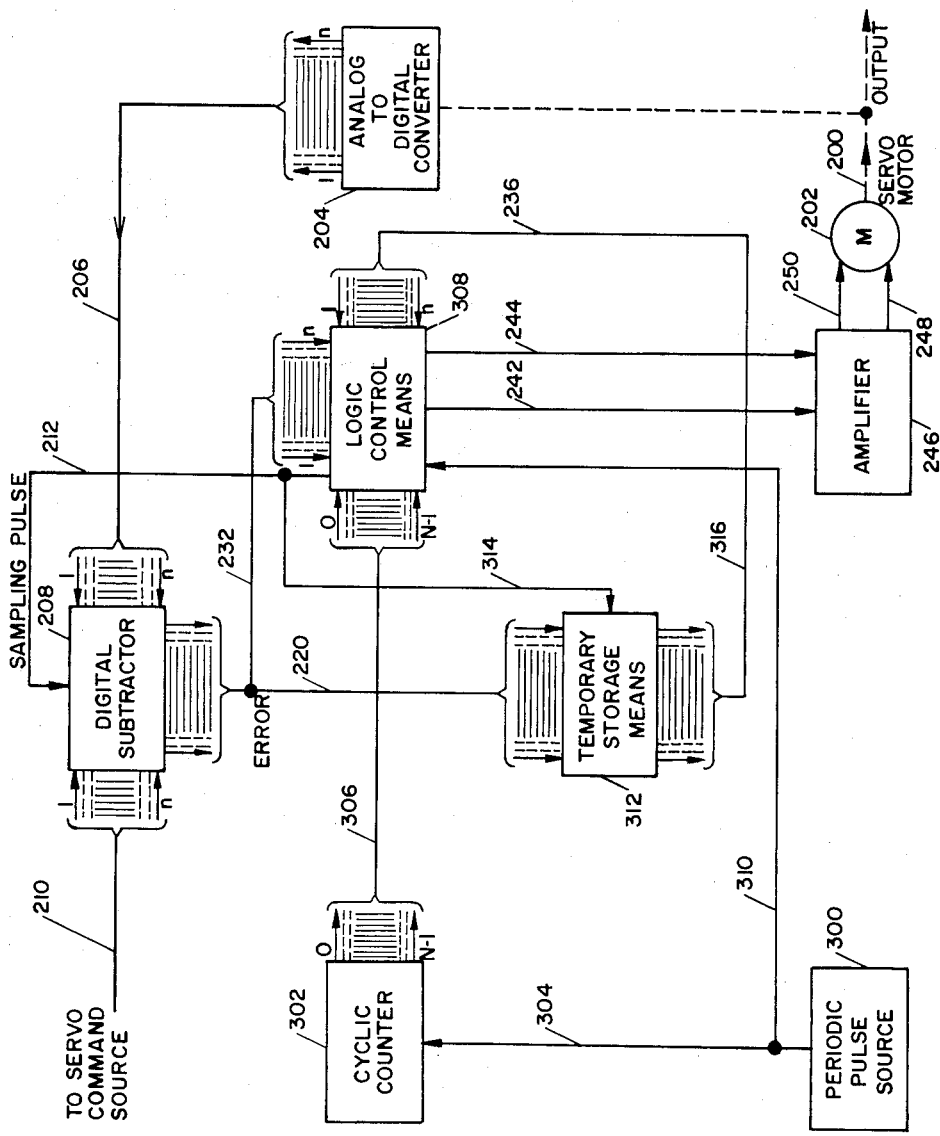

United States Patent Office 2,971,141
Patented Feb. 7, 1961

2,971,141

ERROR SIGNAL SAMPLING DIGITAL SERVO SYSTEM

James C. Gevas, Newark, N.J., assignor to General Precision, Inc., a corporation of Delaware Filed June 5, 1959, Ser. No. 818,364

7 Claims. (Cl. 318—28)

This invention relates to servo systems and, more particularly, to digital servo systems.

Servo systems, which are well known in the art, are used for adjusting a parameter of adjustable means, such as the position, velocity, etc., in accordance with the error which exists between a command or desired adjustment of the parameter and the actual adjustment thereof.

Heretofore, a servo system has been essentially an analog device. An error signal is developed which is continuously proportional to the error which exists, and the adjusting means, which is usually a servo-motor, is energized with a continuous energizing signal which is derived from and bears some functional relationship with the error signal.

In a simple servo system, the energizing signal for the servo-motor may be merely an amplified version of the error signal itself. In a more complex servo system, where it is desired to anticipate the future error, the energizing signal may be made proportional to the sum of the error signal and the integral or derivative thereof. In more sophisticated servo systems, the constant of proportionality, i.e., the amplification, may be changed from one value to another, depending upon whether the magnitude of the error is more than or less than a predetermined amount.

Regardless of the exact nature of an analog servo system, such servo systems inherently suffer from several defects. Among these defects is the fact that the energizing signal is directly derived from the error signal, as measured. Therefore, noise present in the error signal, which can never be totally eliminated, is reflected in the energizing signal. This is particularly bothersome where the energizing signal is made proportional to the sum of the error signal and its derivative, since relatively low amplitude noise may have an extremely high derivative. Furthermore, due to the fact that it takes a threshold energizing signal just to overcome the inherent friction in the servo-motor, it is impossible to provide the energizing signal with the exact amount of damping necessary to bring the error signal to its null point. If too much damping is introduced, the servo-motor will stop before the error is entirely eliminated. If too little damping is introduced, the null point will be over-shot, causing oscillation of the servo-motor about the null point.

In order to overcome these and other defects arising from the fact that the energizing signal is directly derived from the measured error signal, the present invention is directed to a servo-system operating on different principles.

Briefly, the present invention contemplates periodically sampling the error which exists, storing this error, and then selecting in accordance with the respective specific values of the past and present errors a particular one of a discrete number of signals, each of which has a different fixed predetermined characteristic, which is then applied as the energizing signal for the servo-motor. In order to facilitate doing this, the error signal is obtained in digital form.

Often the desired or command magnitude for the servo system comes from a computer, telemetering receiver, etc., in digital form. In an analog servo system it is necessary to provide a digital-to-analog converter to provide this information in analog form. Such a conversion not only increases the complexity of an analog system, but tends to reduce its accuracy and stability quite markedly. Since the servo system of the present invention is digital to begin with, it is particularly suited for receiving its desired or command magnitude in digital form from a computer, telemetering receiver, etc.

It is, therefore, an object of this invention to provide a novel way to adjust adjustable means.

It is another object of this invention to provide a novel servo system.

It is a further object of this invention to provide a digital servo system.

It is a still further object of this invention to provide a servo system wherein the error which exists is periodically sampled in digital form.

It is a still further object of this invention to provide as an energizing signal for a servo system a selected one of a discrete number of signals, each of which has a different fixed predetermined characteristic.

It is a still further object of this invention to provide a servo system in which present and past sampled errors are used to select one of a number of discrete signals, each of which has a different fixed predetermined characteristic, which is then utilized as the energizing signal of the servo system.

There are a multitude of circuit arrangements by which the objects of the present invention may be accomplished. However, broadly speaking these fall into two general classes.

In a first class, each and every one of the discrete number of signals, each of which has a different fixed predetermined characteristic, is permanently stored and means responsive to the respective specific values of the present and/or past errors are utilized to select which one of the permanently stored signals is applied at any given time as the energizing signal to the servo-motor of the servo system. It is a feature of this invention to provide a circuit arrangement which is typical of this first class.

In a second class, the selected one of the discrete number of signals, each of which has a different fixed predetermined characteristic, which is applied at any given time as the energizing signal to the servo-motor of the servo system, is actually generated in accordance with the respective specific values of the present and/or past errors. It is another feature of this invention to provide a circuit arrangement which is typical of this second class.

These and other attendant objects features and advantages of the present invention will become apparent from the following detailed description taken together with the accompanying drawing, in which:

Figure 3 shows in block form a circuit arrangement typical of the second class, mentioned above, which the present invention may take.

Figure 1:
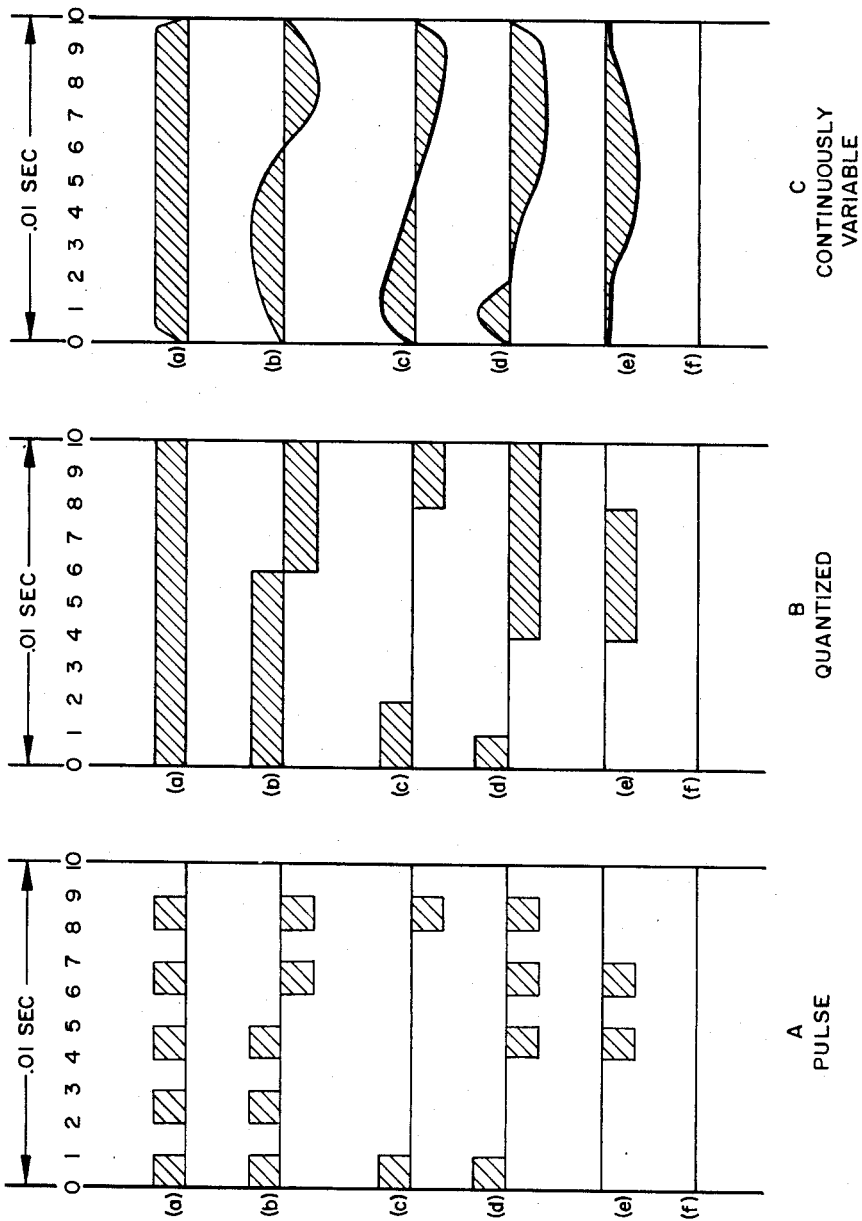
Figure 1 shows in graph form some representative fixed predetermined characteristics which may be had by the discrete number of signals.

Referring now to Figure 1, there is shown three sets, identified as A, B, and C, respectively, of six fixed predetermined characteristics, identified as (*a*) to (*f*), inclusive, which are representative of the various forms the characteristics of the discrete number of signals may take.

Each of the signals is assumed to have a duration of .01 second, which would be the interval between successive samplings, and the interval of .01 second is divided into 10 equal sub-intervals of .001 second.

Set A of Figure 1 shows the various fixed predetermined characteristics in pulse form; set B of Figure 1 shows the various fixed predetermined characteristics in quantized form, and set C of Figure 1 shows the various fixed predetermined characteristics in continuously variable form. The corresponding fixed predetermined characteristics (a)–(f) respectively, in sets A, B, and C, provide generally analogous characteristics from a functional point of view.

Set A, which provides the characteristics in pulse form is adapted for use with an A.C. servo-motor. Set B, which provides the characteristics in quantized form, and set C, which provides the characteristics in continuously variable form, are adapted for use with a D.C. servo-motor. The quantized characteristics of set B have the advantage that they are easy to construct and reproduce. The continuously variable characteristics of set C have the advantage that they can provide more versatile control.

Considering characteristic (a) of set A, it will be seen that characteristic (a) provides the maximum possible magnitude of signal in a given sense. Therefore, in response to an energizing signal having characteristic (a), a servo-motor would be subject to the maximum amount of acceleration in a given direction. In a similar manner, characteristics (a) of sets B and C would produce the same effect.

Considering characteristic (b) of set A, it will be seen that in response to an energizing signal having characteristic (b) a servo-motor would be accelerated for an interval of .006 second and then braked for the remaining interval of .004 second. Characteristic (b) of sets B and C would produce a similar effect. However, in the case of set C, the magnitude of the acceleration of the servo-motor would gradually increase from zero to a maximum during the first .003 second, then gradually decrease from the maximum back to zero during the next .003 second. In a similar manner, the magnitude of the braking would gradually increase from zero to a maximum during the next .002 second and then decrease back to zero during the last .002 second.

Considering characteristic (c) of set A, it will be seen that in response to an energizing signal having characteristic (c), a servo-motor would be accelerated for a short interval at the begining of a .01 second period, and then would coast until it were braked for a short interval at the end of the .01 second period. Characteristic (c) of set B would produce a similar effect. In the case of characteristic (c) of set C, however, the servo-motor the magnitude of the acceleration would quickly increase from zero to a maximum during the first .001 second, and then slowly decrease back to zero during the next .004 second. In a similar manner, the magnitude of the braking would slowly increase from zero to a maximum during the next .004 second and then quickly decrease back to zero during the last .001 second.

From the above analysis of characteristics (a), (b) and (c), the effect of an energizing signal having the characteristic shown in (d) or (e) of sets A, B or C on the operation of a servo-motor, will become apparent.

It will be seen that characterisic (f) of sets A, B and C, in which the signal has zero magnitude throughout the .01 second interval, will cause the servo-motor to coast, if it is already rotating, or to remain stationary, if it is already stationary.

It is clear that each of sets A, B and C could include many other patterns not shown in Figure 1, any one of which could provide the characteristic of an energizing signal. Furthermore, in the case of sets A or B, if finer control were required, the .01 second interval could be divided into more than 10 subintervals, such as one hundred sub-intervals of .0001 second each. Alternately, in the case of set A, a characteristic of an energizing signal could be made up of both main pulses having a width of .001 second and vernier pulses having a width of .0001 second arranged in any desired pattern.

There are undoubtedly other types of patterns than those suggested here which might be used for the fixed predetermined characteristic of an energizing signal for a servo-motor, or other adjusting means for adjustable means. It is therefore intended that the term "fixed predetermined characteristic" include any type of pattern whatsoever, including characteristic (f), where the signal has zero magnitude throughout the .01 second interval.

Figure 2:
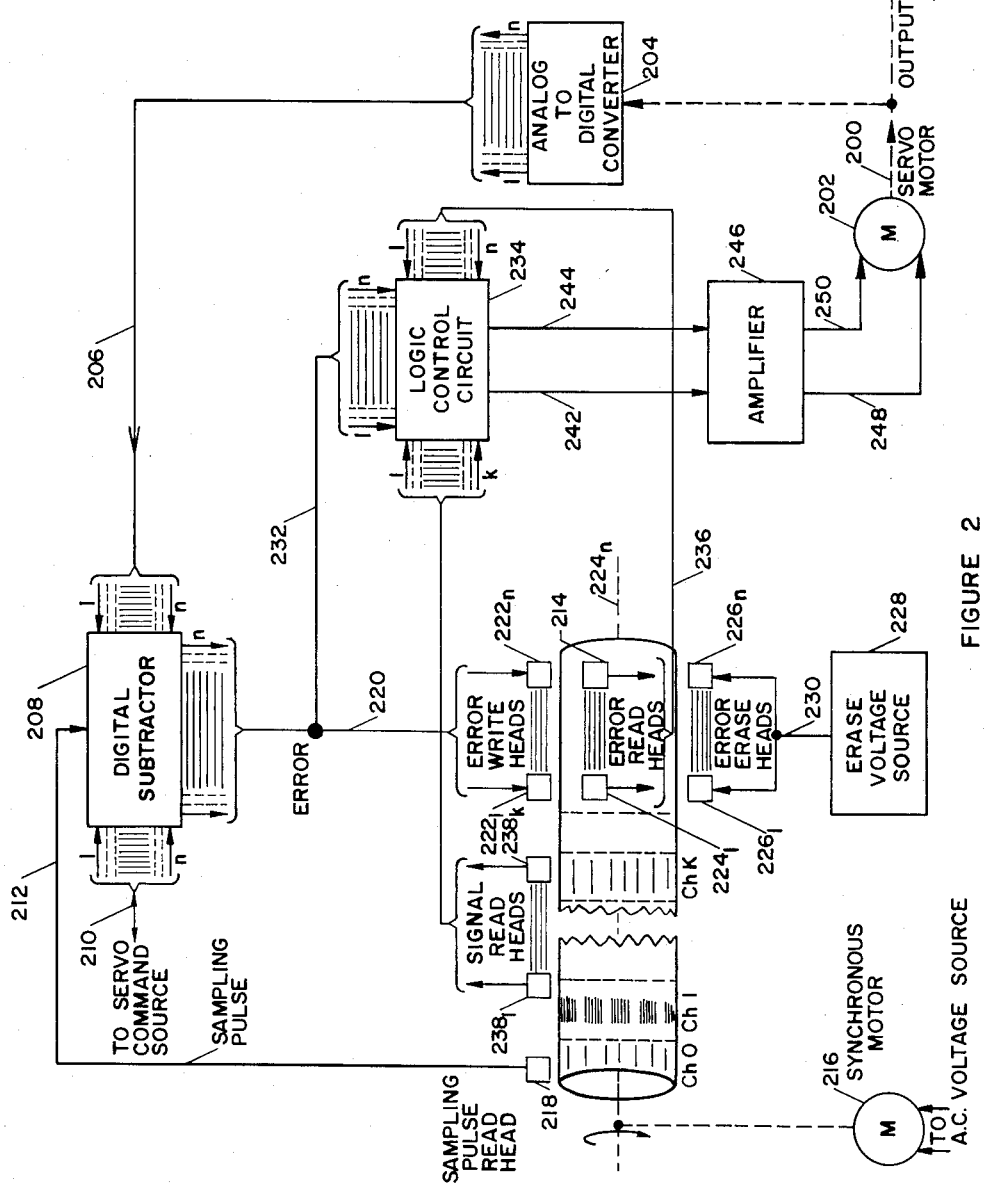
Figure 2 shows in block form a circuit arrangement typical of the first class, mentioned above, which the present invention may take.

Referring now to Figure 2, there is shown a shaft 200 which is rotated by servo-motor 202 in accordance with the phase and magnitude of an energizing signal applied to servo-motor 202. Shaft 200 is coupled to analog-to-digital converter 204. Since an analog-to-digital converter is well known in the art, and does not by itself form any part of this invention, it will not be described in detail. Basically analog-to-digital converter 204 includes means responsive to the magnitude of some given parameter of rotating shaft 200, such as position or velocity, to produce electrical markings on a group of output conductors manifesting in some digital form, such as binary form, the value in appropriate units, such as degrees, degrees per second, etc., of the magnitude of the given parameter.

The output conductors of analog-to-digital converter 204 are connected through cable 206 to one input of digital subtractor 208, to thereby apply to digital subtractor 208 a first signal input manifesting in digital form the actual magnitude of the given parameter of shaft 200. Coupled to another input of digital subtractor 208 is another group of conductors adapted to be connected through cable 210 to a servo command source (not shown), such as a computer, a telemetering receiver, etc., over which is applied to digital subtractor 208 a second signal input manifesting in digital form the desired or command magnitude of the given parameter of rotatng shaft 200.

Digital subtractor 208 is of a type well known in the computer art, which, when operated, provides an output signal in digital form manifesting the algebraic difference of one signal input applied thereto relative to the other. Normally digital subtractor 208 is rendered inoperative. However, it is rendered operative during the application of a sampling pulse thereto over conductor 212. In the case at hand, the output signal from digital subtractor 208 manifests in digital form the magnitude and sense of the error which exists between the actual and desired or command magnitudes of the given parameter of rotating shaft 200 at the time a sampling pulse is applied to digital subtractor 208.

The circuit arrangement shown in Figure 2 includes magnetic drum 214, which is rotated at a constant speed by synchronous motor 216. Synchronous motor 216 is energized by an A.C. voltage source of a given frequency. It is assumed for the purposes of this discussion that magnetic drum 214 rotates at a rate of 600 r.p.m. However, in practice any other constant rate of rotation of drum 214 could be employed.

Magnetic drum 214 is divided axially into a plurality of separate circumferential channels. Pre-recorded on channel 0 of drum 214 are 10 equally spaced pulses. In cooperative relationship with channel 0 of drum 214 is sampling pulse read head 218, which is connected to conductor 212. It will be seen that for each revolution of drum 214, 10 sampling pulses will be produced in conductor 212. Since drum 214 is assumed to be rotating at a rate of 600 r.p.m., the interval between successive sampling pulses will be .01 second. Thus, digital subtractor 208 produces an error signal output, manifesting in digital form the then present error which exists, every .01 second.

An error signal output from digital subtractor 208 is applied over a group of output conductors through cable 220 to a corresponding group of error write heads, 222$_1$–

$222_n$, inclusive, each of which is in cooperative relationship with a separate channel of drum 214. This results in an error signal from digital subtractor 208 being recorded on the associated channels of drum 214. As drum 214 rotates, a recorded error signal is displaced one-tenth of the circumference of drum 214, or 36°, when the next sampling pulse is applied to digital subtractor 208. In cooperative relationship with this displaced position of a recorded error signal are a corresponding group of error read heads $224_1$–$224_n$, inclusive, for reproducing a recorded error signal.

Oriented beyond error read heads $224_1$–$224_n$, inclusive, in cooperative relationship with the associated channels of drum 214, are a corresponding group of error erase heads $226_1$–$226_n$, inclusive, which are connected to erase voltage source 228 over conductor 230. The group of erase heads $226_1$–$226_n$, inclusive, are effective in erasing a recorded error signal after it has been reproduced by error read heads $224_1$–$224_n$, inclusive. Thus, the associated channels of drum 214 are always prepared for recording a new error signal when they pass error write heads $222_1$–$222_n$, inclusive.

In addition to being applied to error write heads $222_1$–$222_n$, inclusive, through cable 220, an error signal output from digital subtractor 208 is also applied directly through cable 232 as a first input to logic control circuit 234. The reproduced error signal obtained from error read heads $224_1$–$224_n$, inclusive, is applied through cable 236 as a second input to logic control circuit 234.

Each of channels I–K, respectively, of drum 214 has a series of signals pre-recorded thereon, each of which occurs in the interval between successive pre-recorded sampling pulses. Therefore, since it has been assumed for the purpose of this discussion that there are 10 sampling pulses pre-recorded on channel 0 of drum 214 each of channels I–K, respectively, will have 10 signals pre-recorded thereon. All of the 10 signals pre-recorded on any one of channels I–K, inclusive, have identical predetermined characteristics. However, the predetermined characteristics of the signals pre-recorded on separate ones of channels I–K, inclusive, are different.

The predetermined characteristics may be of the pulse form, shown in set A of Figure 1, the quantized form shown in set B of Figure 1, or the continuously variable form shown in set C of Figure 1.

In cooperative relationship with channels I–K, inclusive are a group of signal read heads $238_1$–$238_k$, inclusive, for reproducing the pre-recorded signals. The reproduced pre-recorded signals from signal read heads $238_1$–$238_k$, inclusive, are applied through cable 240 as a third input to logic control circuit 234.

As previously mentioned, the spacing between error read heads $224_1$–$224_n$, inclusive, and error write heads $222_1$–$222_n$, inclusive, is such that an error signal is reproduced at the time that the next sampling pulse is applied to digital subtractor 208. Therefore, the error signal applied through cable 232 as the first input to logic control circuit 234, manifesting the present error, and the reproduced error signal applied through cable 236 as the second input to logic control circuit 234, manifesting the immediately past error, occur simultaneously.

Logic control circuit 234 may be any circuit which is prewired to be responsive to the respective specific values of the present and immediately past errors, as manifested by its first and second inputs, in a manner such that, in accordance with the respective specific values of the present and immediately past errors, the output therefrom is either a selected one of the signals applied thereto as a third input thereof or is of zero magnitude (the case where a signal having characteristic ($f$) of sets A, B and C of Figure 1 is indicated by the respective specific values of the present and immediately past errors).

For example logic control circuit 234 may consist of a group of normally off "and" gates, each of which is associated with a separate one of the signals applied as the third input to logic control circuit 234. The "and" gates are controlled by the first and second inputs to logic control circuit 234, manifesting the present and immediately past errors, respectively, to switch off any previously conducting "and" gate and then to switch on either none or a selected single one of the "and" gates in accordance with the respective specific values of the present and immediately past errors. The outputs of all the "and" gates are connected in parallel so that one of the third input signals which is applied to a conducting "and" gate is applied as the output from logic control circuit 234.

The output from logic control circuit 234 is applied over conductors 242 and 244 as the input to amplifier 246. The output of amplifier 246 is applied over conductors 248 and 250 as an energizing signal to servomotor 202.

From the foregoing description of the circuit arrangement of Figure 2, it will be seen that, since the characteristic of an energizing signal is not derived from the error signal, but the error signal is merely used to control the selection of the characteristic, which has been derived from pre-recorded data, the defects of analog servo systems, discussed above, are eliminated, and a versatility not present in analog servo systems is achieved.

It will be apparent to those skilled in the art that the functions performed by magnetic drum 214 can be performed equally well with magnetic core matrices or with any other well known data storage means. It is therefore intended that the substitution of any other data storage means to perform the functions performed by magnetic drum 214 should be considered the equivalent of magnetic drum 214.

Referring now to the circuit arrangement of Figure 3, elements 200, 202, 204, 206, 208, 210, 212, 220, 232, 236, 242, 244, 246, 248, and 250 of Figure 3 are identical both in structure and function with the correspondingly numbered elements of Figure 2, described in detail above.

In Figure 3, periodic pulse source 300 generates a periodic pulse output at a fixed frequency such as 1000 pulses per second, for example. The periodic pulse output form periodic pulse source 300 is applied as an input to cyclic counter 302 over conductor 304. Cyclic counter 302 is any well known counter which counts pulses applied thereto and in response to the Nth pulse applied thereto, where N is any integer greater than one, returns to an initial condition. For the purpose of this discussion it will be assumed that __ is equal to 10.

Counter 302 has a group of N, in this case 10, output conductors. Counter 302 may be designed to apply an electric marking to any one of these output conductors in accordance with the count of counter 302. Thus, in its initial condition a marking is applied to conductor 0, after one pulse has been counted, the marking is applied to conductor 1; and so on, until after $N-1$, in this case 9, pulses have been counted, the marking is applied to conductor $N-1$. After the Nth, in this case 10th, pulse has been counted the marking is reapplied to conductor 0, and the cycle is then repeated in response to additional pulses having been counted.

The group of output conductors from counter 302 is applied through cable 306 as one input to logic control means 308. The periodic pulse output from periodic pulse source 300 is also applied over conductor 310 as another input to logic control means 308.

Logic control means 308 includes normally off gating means to which the periodic pulses are applied. This gating means 1 is switched on in response to a marking being present on conductor $N-1$, in this case conductor 9, manifesting that cyclic counter 302 has counted $N-1$, or 9 pulses. Therefore, when the next pulse (i.e., the Nth or in this case the tenth pulse) is applied to this gating means it will pass through the gating means and produce a sampling pulse output from logic control means 308, which occurs coincidentally with the recycling of cyclic counter 302.

The sampling pulse output from logic control means 308 is applied over conductor 212 to digital subtractor 208, where, as described above in connection with Figure 2, it renders digital subtractor 208 operative to produce an error signal output therefrom, which manifests in digital from the magnitude and sense of the error which exists between the actual and desired or command magnitudes of the given parameter of rotating shaft 200.

The error signal output from digital subtractor 208 is applied through cable 232 as an input to logic control means 308 and is applied through cable 220 as an input to temporary storage means 312. In addition, the sampling pulse output from logic control means 308 is applied over conductor 314 as another input to temporary storage means 312.

Temporary storage means 312 may be any well known means for storing data for a limited time, such as magnetic core matrices or a rotating magnetic drum, such as used for storing the error signal in Figure 2. The sampling pulse is used for synchronizing the writing in and reading out of information.

In any event, temporary storage means 312 stores the error signal applied thereto for an interval between two successive sampling pulses, whereupon it applies the stored error signal over cable 316 as an input to logic control means 308. Therefore, as in the circuit arrangement of Figure 2, signals manifesting the present and immediately past errors are applied as respective inputs to the logic control circuitry.

However, logic control means 308 performs a somewhat different function than logic control circuit 324 of Figure 2.

In accordance with the assumption made earlier, ten periodic pulses are applied to logic control means 308 each cycle. Logic control means 308 is prewired in such a manner that in accordance with the respective specific values of the present and immediately past errors an output will be generated during a cycle in response to each counted pulse in the cycle, which output has either a given positive magnitude, a given negative magnitude, or a zero magnitude. Thus, with ten pulses per cycle, depending on the manner in which logic control 308 is prewired, the generated output will have either a pulse characteristic, such as shown in set A of Figure 1, a quantized characteristic, such as shown in set B of Figure 1, or a continuously variable characteristic, such as shown in set C of Figure 1.

By way of example, logic control means 308 may consist of two sets of normally off "and" gates, corresponding "and" gates of each set being associated with a separate one of the group of output conductors from counter 302 so that a first control signal is applied to the gates of each set in accordance with the count marking on the group of output conductors from counter 302. A second control signal is applied to specified gates of each set by translating means, in accordance with the respective specific values of the present and immediately past errors. Although neither of the pair of corresponding gates in the two sets may have a second control signal applied thereto, if one of the pair does have a second control signal applied thereto, the other of the pair will definitely not have a second control signal applied thereto. The periodic pulses are applied to all the gates of both sets. However, only gates which have both the first and second control signals applied thereto will be switched on in response to the next applied pulse. One set of gates is effective in response to one of the gates therein being switched on in applying a positive output signal over conductors 242 and 244 as an input to amplifier 246, and the other set of gates is effective in response to one of the gates therein being switched on in applying a negative output signal over conductors 242 and 244 as an input to amplifier 246.

As in Figure 2, the output of amplifier 246 is applied over conductors 248 and 250 as an energizing signal to servo-motor 202.

Although there is no end to the number of different characteristics which can be provided by the circuit arrangements of Figures 2 and 3, not all of these different characteristics would be useful in controlling the operation of a servo-motor. Therefore, only those characteristics would be used which had been empirically determined under specified error conditions to most effectively minimize the error. The total number of signals, each having a different fixed predetermined characteristic which would be used would depend on the desired sophistication of the servo system. In some cases it might be desirable to provide a cruder error control for the sake of simplicity or low cost. However, in any given case, more accurate control may be obtained by employing the digital servo system described herein than could be obtained by any prior servo system of comparable complexity.

Although only two preferred embodiments of the invention have been described herein it is not intended that the invention be restricted thereto, but that it be limited only by the true spirit and scope of the appended claims.

I claim:

1. A servo system comprising a shaft, a servo-motor coupled to said shaft for rotating said shaft in accordance with the characteristic of an energizing signal applied thereto, an analog-to-digital converter coupled to said shaft to provide a first signal manifesting in digital form the actual magnitude of a given parameter of said rotating shaft, a digital subtractor, means for applying to said digital subtractor said first signal and a second signal manifesting in digital form a command magnitude of said given parameter of said rotating shaft, means for periodically applying a sampling pulse to said digital subtractor to provide an error signal from said digital subtractor manifesting in digital form the error between the actual and command magnitudes of said given parameter of said rotating shaft at the time of sampling, means for storing said error signal for one period of said sampling pulse, and logic control means, controlled in response to the specific values of an error signal and said stored error signal, respectively, for applying one of a discrete number of energizing signals, each of which has a different fixed predetermined characteristic, to said servo-motor until the next sampling.

2. A device as claimed in claim 1, including energizing signal supply means, said logic control means selecting, in response to said present and past sampled errors one of a plurality of a number of signals, said signals including, a characteristic providing the maximum possible magnitude of signal in a given sense at one extreme, zero magnitude at the other extreme, and combinations of gradually decreasing magnitude and increasing brake effect between said extremes.

3. A servo system comprising a shaft, a servo-motor coupled to said shaft for rotating said shaft in accordance with the characteristic of an energizing signal applied thereto, an analog-to-digital converter coupled to said shaft to provide a first signal manifesting in digital form the actual magnitude of a given parameter of said rotating shaft, a digital subtractor, means for applying to said digital subtractor said first signal and a second signal manifesting in digital form a command magnitude of said given parameter of said rotating shaft, a magnetic drum having a plurality of recording channels, means for rotating said drum at a constant speed, means responsive to prerecorded information on one channel of said drum for deriving periodic sampling pulses, means for applying each sampling pulse to said digital subtractor to provide an error signal from said digital subtractor manifesting in digital form the error between the actual and command magnitudes of said given parameter of said rotating shaft at the time of sampling, means for recording said error signal on an appropriate number of other channels of said drum, means operated at the next sampling for reproducing the recorded error signal, means responsive, respectively, to each of a discrete number of signals, each of which is prerecorded on a separate channel of said drum, each of said signals occurring between successive samplings and having a different characteristic, logic control means, means for applying said error signal, said reproduced error signal and said discrete number of signals to said logic control means, said logic control means selecting a particular one of said discrete number of signals in accordance with the specific values of said error signal and said reproduced error signal, respectively, and means for applying said selected one of said discrete number of signals as said energizing signal to said servo-motor until the next sampling.

4. A servo system comprising a shaft, a servo-motor coupled to said shaft for rotating said shaft in accordance with the characteristic of an energizing signal applied thereto, an analog-to-digital converter coupled to said shaft to provide a first signal manifesting in digital form the actual magnitude of a given parameter of said rotating shaft, a digital subtractor, means for applying to said digital subtractor said first signal and a second signal manifesting in digital form a command magnitude of said given parameter of said rotating shaft, a periodic pulse source, a cyclic counter coupled to said pulse source for counting N pulses per cycle, where N is any integer greater than one, to provide an output manifesting the number of pulses that has been counted in any cycle, logic control means coupled to said cyclic counter and said periodic pulse source for applying said output of said counter and said periodic pulses to said logic control means, said logic control means deriving a sampling pulse once each cycle of said cyclic counter, means for applying said sampling pulse to said digital subtractor to provide an error signal from said digital subtractor manifesting in digital form the error between the actual and command magnitudes of said given parameter of said rotating shaft, means for temporarily storing said error signal until the next sampling pulse, means for applying said error signal and said stored error signal to said logic control means, said logic control means being conditioned in accordance with the specific values of an error signal and a stored error signal, respectively, to derive from the counted pulses applied thereto during a cycle a particular one of a discrete number of output signals, each of which has a different fixed predetermined characteristic, and means for applying the output signal from said logic control means as said energizing signal to said servo-motor until the next sampling.

5. A servo system comprising adjustable means, servo means coupled to said adjustable means for adjusting said adjustable means in accordance with the characteristics of a signal applied to said servo means, computer means associated with said adjustable means adapted to provide the error difference between a command magnitude to be applied to said adjustable means and the actual magnitude of said adjustable means; sampling means for periodically sampling said error difference; storage means to store said error difference for one sample period, energizing signal supply means, and logic control means controlled in response to the specific values of said present error difference and said stored error difference for applying one of a discrete number of energizing signals, each of which has a different fixed predetermined characteristic, to said servo means until the next sampling.

6. A device as claimed in claim 5, said computer means including an analog-to-digital converter, and, a digital subtractor, said command magnitude being supplied in digital form, said error difference being obtained in digital form.

7. A device as claimed in claim 6, said sampling means periodically sampling of said error being done in a time interval which is a time unit of any rate of change in said adjustable means, said energizing signal supply means supplying signals which are constant at both signal extremes over said one unit period, and having intermediate signals of graduated and changing magnitude over fractional periods of said unit period.

References Cited in the file of this patent

UNITED STATES PATENTS 2,455,364     Hays  ---------------- Dec. 7, 1948